Sept. 26, 1933.  M. OLLEY  1,928,228
SHOCK ABSORBER
Filed Nov. 25, 1931  3 Sheets-Sheet 1

Inventor
MAURICE OLLEY

Inventor
MAURICE OLLEY

Sept. 26, 1933.   M. OLLEY   1,928,228
SHOCK ABSORBER
Filed Nov. 25, 1931   3 Sheets-Sheet 3

Inventor
MAURICE OLLEY
By Spencer, Hardman and Fehr
Attorneys

UNITED STATES PATENT OFFICE

1,928,228

SHOCK ABSORBER

Maurice Olley, Detroit, Mich., assignor to Delco Products Corporation, Dayton, Ohio, a corporation of Delaware Application November 25, 1931
Serial No. 577,268

21 Claims. (Cl. 188—88)

This invention relates to improvements in hydraulic shock absorbers.

It is among the objects of the present invention to provide a hydraulic shock absorber capable of automatically adjusting itself properly to control relative movements between the body and axle of the vehicle in accordance with the nature of the roadbed over which the vehicle is being operated.

A further object of the present invention is to provide a shock absorber which is automatically adjustable solely in response to accelerations of the vehicle body downwardly toward the axle of the vehicle.

A still further object of the present invention is to provide the hydraulic shock absorber which is adapted to be adjusted automatically to increase its resisting efforts in response to accelerations of the vehicle body toward the axle at a predetermined acceleration.

Further objects and advantages of the present invention will be apparent from the following description, reference being had to the accompanying drawings wherein a preferred embodiment of one form of the present invention is clearly shown.

Figure 1:
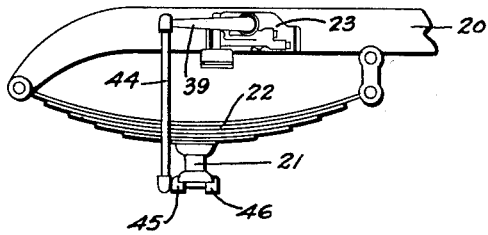
Fig. 1 is a fragmentary side view of the vehicle chassis having a shock absorber embodying the present invention applied thereto.

Referring to the drawings and more particularly to Fig. 1 the numeral 20 designates the frame of the vehicle which is supported on the vehicle axle 21 by vehicle springs 22, only one of which is shown. The shock absorber, designated as a a whole by the numeral 23, comprises a casing 24 providing a fluid reservoir 25 and a cylinder 26. The open ends of the cylinder are provided with cylinder end caps 27 and 28 respectively, said caps having proper gaskets to prevent leakage at these points. Within the cylinder there is provided a piston 30 having piston head portions 31 and 32 the former forming the "spring compression control chamber" 33 while the piston head portion 32 forms the "spring rebound control chamber" 34 in the opposite end of the cylinder. Each piston head portion is provided with a wear piece 35 which is engaged by the free end 36 of a rocker arm 37 provided on the rocker shaft 38. This rocker arm 38 is journalled in bearings 39 and 40 provided in a shock absorber casing 20. One end of the rocker shaft 38 extends outside of the shock absorber casing and has the shock absorber operating arm 39 attached thereto. A packing 40 is provided in a recess in the casing about the shaft 38 to prevent fluid leakage at this point. The rear end of the shock absorber casing is open as at 41 to permit insertion of the rocker arm 38 and its rocker shaft 37, this opening being sealed by a cover 42 attached to the casing by screws 43. The free end of the shock absorber operating arm 39 is swivelly attached to one end of the link 44 the opposite end of said link being swivelly secured to a bracket 45 which is clamped upon the axle 21 by the member 46.

Figure 3:
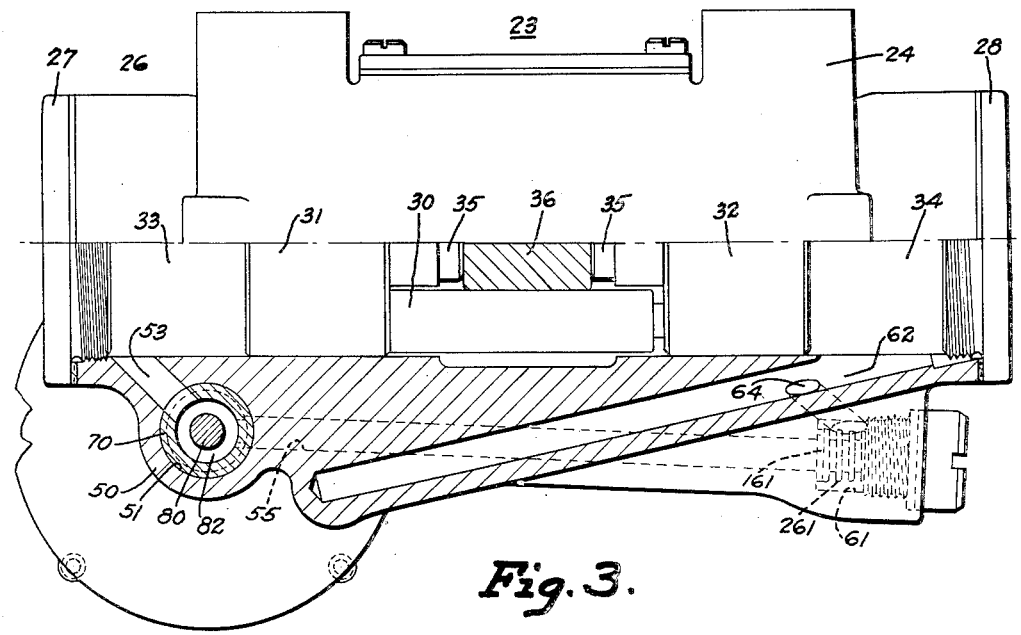
Fig. 3 is a fragmentary sectional view taken substantially along the line 3—3 of Fig. 2.
Figure 4:
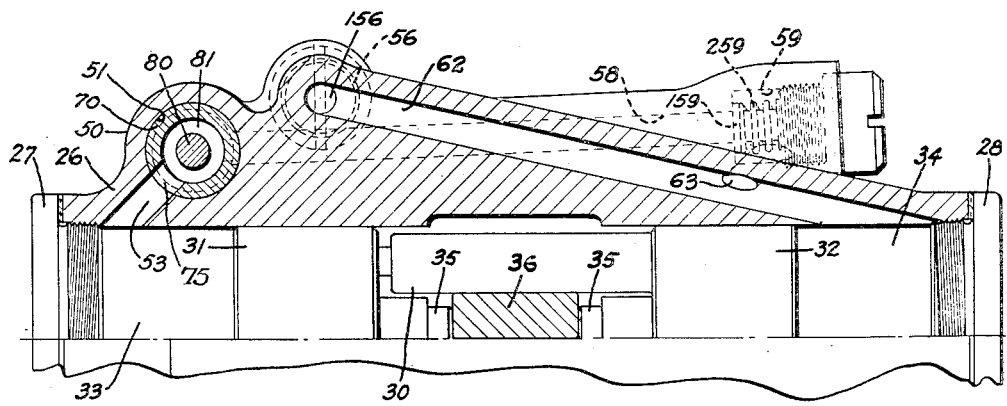
Fig. 4 is a view similar to Fig. 3 but taken along the line 4—4 of Fig. 2.
Figure 5:
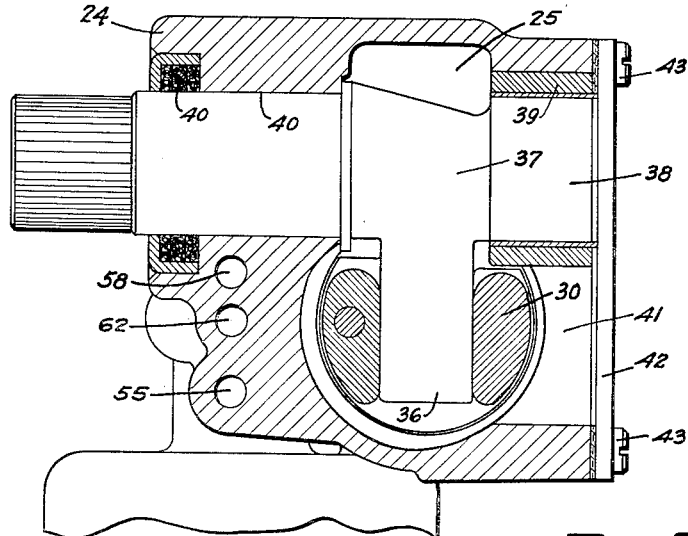
Fig. 5 is a transverse sectional view taken substantially along the line 5—5 of Fig. 2
Figure 6:
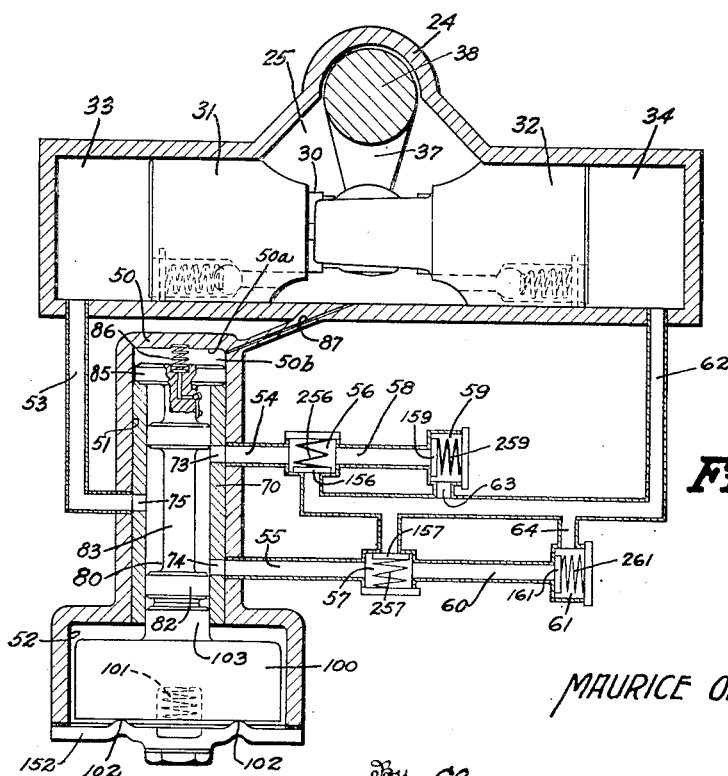
Fig. 6 is a diagrammatic view of the shock absorber showing the fluid flow passages and their respective fluid flow control devices.

It may readily be seen that as the axle 21 is moved toward or from the vehicle frame 20, link 44 and arm 39 will rotate the shaft 38 clockwise and counterclockwise respectively, thus, the piston 30 will be moved to the left or right respectively as regards Figs. 3, 4 and 6 thus exerting pressure upon the fluid within the spring compression control and spring rebound control chambers 33 and 34 respectively. To relieve these pressures ducts are provided which form communications between the two compression chambers. Suitable fluid flow control devices are provided in these ducts for controlling the fluid flow therethrough.

The casing 20 has an extension 50 recessed to provide concentric cylindrical portions 51 and 52. The cylinder 51 may be termed the "control valve cylinder" while cylinder 52 may be termed the "weight compartment" of the shock absorber. A duct 53 leads from the spring compression control chamber 33 into the control valve cylinder 51 as clearly shown in the diagrammatic view in Fig. 6. Two fluid passages 54 and 55 lead from the control valve chamber 51 into pressure release valve chambers 56 and 57 respectively. The opening of these passages 54 and 55 into the control valve chamber 51, are in spaced relation as shown in the Figs. 2 and 6. An extension 58 of passage 54 provides communication between the valve chamber 56 and the valve chamber 59. A similar extension 60 of the passage 55 connects the valve chamber 57 with the valve chamber 61. All of the valve chambers 56, 57, 59 and 61 are provided with spring loaded pressure release valves. Valve 156 is in the chamber 56 and is urged against its valve seat by a spring 256. Valve 157 is in chamber 57 and is urged against its valve seat by spring 257. Valve chamber 59 has the valve 159 urged against its seat by spring 259 and chamber 61 has a valve 161 which is urged against its seat by a spring 261. Springs 256 and 259 for valves 156 and 159 respectively are of greater tension than the springs 256 and 261 of valves 157 and 161 and thus, valves 156 and 159 may be termed the "high pressure release valves" while valves 157 and 161 may be termed the "low pressure release valves".

A duct 62 leads from the spring rebound control chamber 34 directly to the valve chamber 56 communication between the said duct and valve chamber being normally cut off by the high pressure release valve 156. Duct 62 is also in communication with chamber 57 being cut off from this chamber by the low pressure release valve 157. A cross passage 63 connects the duct 62 with the valve chamber 59 on the relief side of the valve 159 and a similar cross passage 64 connects said duct 62 with the chamber 61 on the relief side of the valve 161 in said chamber. From this it may be seen that duct 62 may discharge into chambers 56 and 57 and chambers 59 and 61 may discharge into the duct 62.

Figure 2:
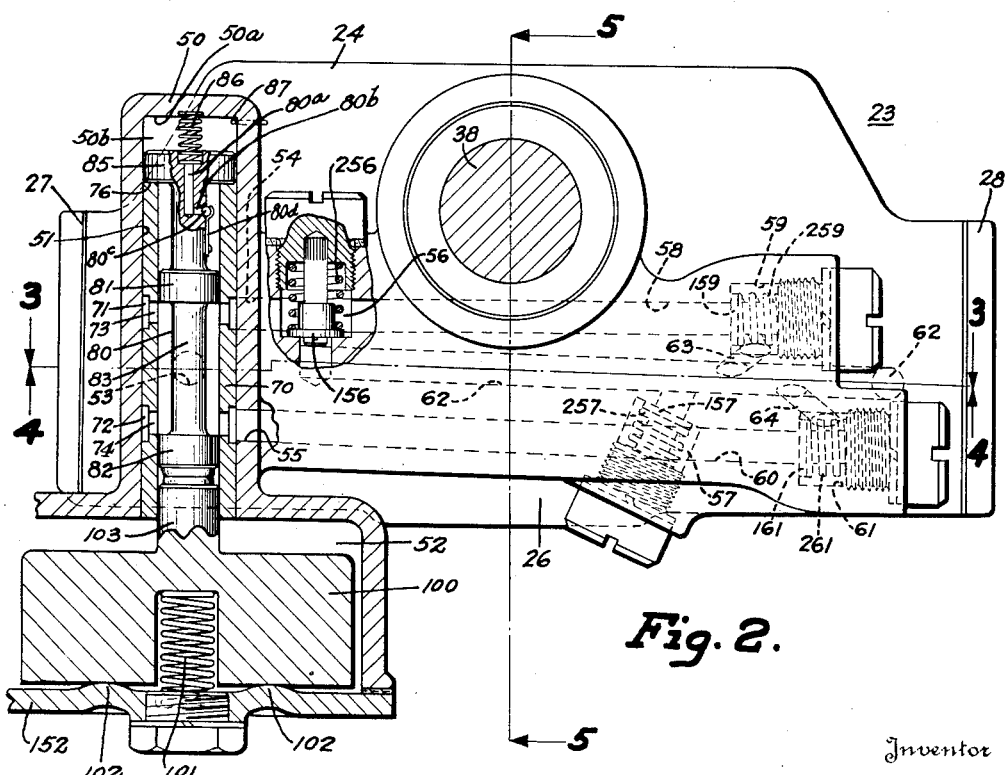
Fig. 2 is a full size side view of the shock absorbers, certain portions thereof being shown in section more clearly to illustrate interior structures.

Within the control valve cylinder 51 there is press fitted a sleeve 70 having annular grooves 71 and 72 in its outer surface, which grooves align with the openings of the passage 54 and 55. Cross passages 73 and 74 provide communication between the annular grooves 71 and 72 respectively and the interior of the sleeve as shown in Fig. 2. Another opening 75 in the sleeve provides communication between the duct 53 and the interior of the sleeve 70. The upper end of the sleeve 70 designated by the numeral 76 terminates a distance from the interior end 50a of the control valve cylinder 51. Sleeve 70 slidably supports the control valve 80 which as shown in Figs. 2 and 6 has two head portions 81 and 82 slidably fitting into the sleeve 70 and connected together in spaced relation by a stem 83 of comparatively lesser diameter than the head portions 81 or 82. Another head portion 85 is provided on the control valve 80, this head portion fitting slidably into the cylinder 51, within the space 50b between the end 76 of the sleeve 70 and the inner end 50a of the cylinder as shown in Figs. 2 and 6. A spring 86 is interposed between the head 85 and the inner end of the cylinder 51, whereby the valve 80 is normally maintained so that its head portion 85 rests upon the end 76 of the sleeve 70. A passage 87 connects the chamber 50b in which the piston head 85 of the control valve 80 operates, with the fluid reservoir 25 of the casing. The valve 80 has a passage 80a which leads from the upper end of the valve into a cross passage 80b opening into the chamber formed in the sleeve 70 between valve head portions 81 and 85. A ball check valve 80c is urged by a spring 80d normally to shut off communication between the cross passage 80b and the interior of sleeve 70. Thus as the valve head 85 is moved toward the ceiling 50a of cylinder space 50d, fluid pressure in this space is relieved through passages 80a and 80b and the valve may move upwardly substantially freely, however, the return movement of the valve 80 toward its normal position under the effect of spring 86, will be retarded due to the dash pot effect of chamber 50b which is now open to the casing reservoir 25 only through the comparatively small passage 87. It will be seen in Figs. 2 and 6 piston head portions 81 and 82 of the control valve 80 are so spaced that when the valve 80 is in normal position openings 73 and 74 in the sleeve 70 lie within the space between said piston head portions 81 and 82, however, when the valve 80 is moved toward the end 50a of the cylinder 51 against the effect of spring 86 piston head portion 82 will then shut off communication between the passage 55 communicating with the low pressure release valves 157 and 161 and the interior of the sleeve 70 thereby rendering said low pressure release valves ineffective to establish fluid flows. At no time will the control valve 80 shut off communication between duct 53 and the interior sleeve 70 or passage 54 and the interior of said sleeve.

In the weight compartment 52 which has a cover 152 forming the bottom of said compartment, there is provided an inertia weight element 100, supported upon a spring 101 so that the weight 100 barely engages the humps 102 formed in the cover plate 152. The weight has a central lug 103 extending upwardly into the sleeve 70 and which, due to the provision of spring 101, normally engages the piston head 82 of the valve 80 when the valve 80 is in its normal position.

As the oscillations of the axle and car body begin and the piston 30 is moved back and forth in the cylinder, fluid pressures will move the low pressure release valve 157 and 161 from their respective seats to establish restricted fluid flows between the compression chambers in the cylinder. Supposing, for instance, the axle 21 is moved toward the frame 20 in response to the striking of an obstruction in the roadway, link 44 and arm 39 will move piston 30 toward the left so that its head 31 will exert a pressure upon the fluid within the spring compression control chamber 33 forcing the fluid into the duct 53 and opening 75 of sleeve 70 into the interior of the said sleeve. The fluid will flow into the passage 54, valve chamber 56 and extension 58 of the passage 54 against the valve 159 and, if the pressure is not sufficient, it will not move the valve 159 against the effect of spring 259. The fluid will flow also from sleeve 70 into the opening 74, through the passage 55 into and through the valve chamber 57 and extension 60 of passage 55 against the valve 161 and, if the pressure is sufficient, valve 161 will be moved against the effect of its spring 261 to provide a restricted communication between passage 60 and chamber 61 from thence the fluid will flow through cross passage 64 into the duct 62, into the spring rebound control chamber 34. If the fluid pressure is of sufficient degree so that valve 161 will not properly relieve it then valve 159 will be moved from its seat to establish another restricted flow through valve chamber 59, cross passage 63 into the duct 62, and thence into the spring rebound control chamber.

The rebounding movement of the vehicle spring 22 causes the piston 30 to be moved in the opposite direction so that piston head portion 32 will exert a pressure upon the fluid within the rebound control chamber 34 forcing said fluid through the duct 62. Low pressures will cause fluid flow from the duct 62 to move valve 157 and thus, establish a flow through the valve chamber 57, and passage 55, opening 74, through the sleeve 70, opening 75, and duct 53, into the spring compression control chamber 33. Higher pressures in the chamber 34 will move valve 156 from its seat to establish a restricted flow from duct 62 into the chamber 56, thence into the passage 54 opening 73 into the sleeve 70 thence through opening 75 and duct 53 into the spring compression control chamber 33.

If the oscillations of the car body supporting frame 20, have a sufficient downward acceleration, there will be a relative movement between the inertia weight 100 and the casing of the shock absorber, thus, said weight member 100 will push the control valve 80 upwardly in the cylinder 51, this movement being substantially unresisted because the fluid in the space 50b, between valve head 85 and the upper end of the cylinder 51, is discharged through the passages 80a and 80b past valve 80c into the sleeve 70. Now the passage 55 is entirely cut off from the interior of the sleeve 70 by the valve head 85 and thus no fluid flow can be established by the low pressure release valves 157 nor 161, the high pressure release valves 156 and 159 being capable only of establishing such fluid flows thereby increasing the motion resisting characteristics of the shock absorber. The return movement of the control valve 83 toward its normal position by spring 86, to again render the low pressure release valve effective is substantially retarded by the dash pot 50b at the upper end of the control valve cylinder 51 for now valve 80c will be closed and the only fluid that can enter space 50b will flow through the small passage 87. If the oscillations of the vehicle frame are sufficiently numerous then successive movements of the casing portion 50 relatively to the weight will cause said weight repeatedly to strike the valve and move it upwardly, however, the dash pot tends to hold it up and thus the valve will practically be maintained up under these conditions.

In the present invention applicant has provided a shock absorber adapted automatically to adjust itself in accordance with the nature of road over which the vehicle is being operated. Oscillations of the vehicle frame 20 particularly the downward accelerations thereof toward the axle 21 having exceeded a predetermined value, will render the shock absorber effective to offer the greatest resistance and thus better control to axle and body movements is obtained, thereby substantially improving the riding quality of the vehicle. The shock absorber is so constructed and arranged that when the vehicle is being operated over a comparatively smooth highway relatively small resistance to axle and body movements is offered, the vehicle springs being relied upon to provide the proper cushioning effect, however, when the roadbed becomes rougher and the oscillations of the vehicle frame 20, particularly the downward accelerations thereof toward the axle 21 have exceeded a predetermined value, then the shock absorber will be adjusted automatically to provide the necessary resistance to such frame and axle movements.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing providing a fluid containing cylinder; a piston in said cylinder forming two presson chambers therein; a piston operating member; means adapted to establish fluid flows between the said compression chambers in response to a predetermined fluid pressure in either of said chambers; means adapted to provide for an additional flow of fluid between the compression chambers in response to an increase of pressure above said predetermined fluid pressure; and means governed solely by the oscillations of the casing, for controlling the fluid flow between the compression chambers established by the first mentioned means.

2. A shock absorber comprising in combination, a casing providing a fluid containing cylinder; a piston in said cylinder forming two compresson chambers therein; a piston operating member; low and high pressure operated means adapted successively to establish flows of fluid from one compression chamber into the other; and an inertia weight controlled valve adapted, in response to oscillations of the shock absorber casing, to render one of said pressure operated means ineffective to establish its fluid flow.

3. A shock absorber comprising, in combination, a casing providing a fluid containing cylinder; a piston in said cylinder forming two compression chambers therein; a piston operating member; low and high pressure operated means adapted successively to establish flows of fluid from one compression chamber into the other; and an inertia weight controlled valve adapted, in response to oscillations of the shock absorber casing, to render the low pressure operated means ineffective to establish its flow of fluid in response to accelerations of the shock absorber casing in one direction only.

4. A shock absorber comprising, in combination, a casing providing a fluid containing cylinder; a piston in said cylinder forming two compresson chambers therein; a piston operating member; low and high pressure operated means adapted successively to establish flows of fluid from one compression chamber into the other; and an inertia weight controlled valve adapted, in response to oscillations of the shock absorber casing, to render the low pressure operated means ineffective to establish its flow of fluid, solely in response to the accelerations of the shock absorber casing downwardly toward its weight containing compartment.

5. A shock absorber comprising, in combination, a casing providing a fluid containing cylinder; a piston in said cylinder forming two compression chambers therein; a piston operating member; low and high pressure operated means adapted successively to establish flows of fluid from one compression chamber into the other; a valve in the casing adapted to be moved out of its normal position to render the low pressure operated means ineffective to establish its flow of fluid; and means adapted, in response to accelerations of the casing in one direction only to move said valve out of its normal position.

6. A shock absorber comprising, in combination a casing providing a fluid containing cylinder; a piston in said cylinder forming two compression chambers therein; a piston operating member; low and high pressure operated means adapted successively to establish flows of fluid from one compression chamber into the other; a valve in the casing adapted to be moved out of its normal position to render the low pressure operated means ineffective to establish its flow of fluid; an inertia weight adapted, in response to accelerations of the casing in one direction only, to move said valve out of its normal position; and means for retarding the return of said valve to its normal position.

7. A shock absorber comprising, in combination, a casing providing a fluid containing cylinder; a piston in said cylinder forming two compression chambers therein; a piston operating member; low and high pressure operated means adapted successively to establish flows of fluid from one compression chamber into the other; a valve in the casing adapted to be moved out of its normal position to render the low pressure operated means ineffective to establish its flow of fluid; an inertia weight adapted, in response to accelerations of the casing in one direction only, to move said valve out of its normal position; and a dash pot provided with fluid from the casing, for retarding the return of said valve to its normal position.

8. A shock absorber comprising, in combination, a casing providing a fluid containing cylinder and having a recess providing a valve chamber and a weight compartment; a piston in said cylinder forming two compression chambers therein; a piston operating member; a duct in the casing leading from the one compression chamber into said valve chamber; another duct in the casing leading from the other compression chamber into branch passages which open into said valve chamber; low pressure operated valves to certain of the branch passages for establishing flows of fluid between the ducts and through the valve chamber in either direction in response to a predetermined fluid pressure in the respective compression chambers; high pressure operated valves in certain other of the branch passages to establish flows of fluid between the ducts and through the valve chamber in either direction in response to certain fluid pressures in the respectively compression chambers, in excess of said predetermined pressure; a valve in said valve chamber normally maintaining communication between the one duct and the branch passages of the other duct; and an inertia weight in the weight compartment, adapted to move said valve to shut off communication between said one duct and only one branch passage of the other in response to oscillations of the casing.

9. A shock absorber comprising, in combination, a casing providing a fluid containing cylinder and having a recess providing a valve chamber and a weight compartment; a piston in said cylinder forming two compression chambers therein; a piston operating member; a duct in the casing leading from the one compression chamber into said valve chamber; another duct in the casing leading from the other compression chamber into branch passages which open into said valve chamber; low pressure operated valves in certain of the branch passages for establishing flows of fluid between the ducts and through the valve chamber in either direction in response to a predetermined fluid pressure in the respective compression chambers; high pressure operated valves in certain other of the branch passages to establish flows of fluid between the ducts and through the valve chamber in either direction in response to certain fluid pressures in the respective compression chambers, in excess of said predetermined pressure; a valve in said valve chamber normally maintaining communication between the one duct and the branch passages of the other duct; and an inertia weight in the weight compartment, adapted to move said valve to shut off communication between said one duct and the branch passage having the low pressure operated valve in response to accelerations of the casing in one direction only.

10. A shock absorber comprising, in combination, a casing providing a fluid containing cylinder and having a recess providing a valve chamber and a weight compartment; a piston in said cylinder forming two compression chambers therein; a piston operating member; a duct in the casing leading from the one compression chamber into said valve chamber; another duct in the casing leading from the other compression chamber into branch passages which open into said valve chamber; low pressure operated valves in certain of the branch passages for establishing flows of fluid between the ducts and through the valve chamber in either direction in response to a predetermined fluid pressure in the respective compression chambers; high pressure operated valves in certain other of the branch passages to establish flows of fluid between the ducts and through the valve chamber in either direction in response to certain fluid pressures in the respective compression chambers, in excess of said predetermined pressure; a valve in said valve chamber normally maintaining communication between the one duct and the branch passages of the other duct; an inertia weight element within the compartment of the casing, said weight element being adapted, in response to accelerations of the casing toward said weight compartment only, to move the valve to shut off communication between the branch passage having the low pressure operated valves and the valve chamber; and means for retarding the return movement of the valve into normal position.

11. A shock absorber comprising, in combination, a casing providing a fluid containing cylinder; a piston in said cylinder forming two compression chambers therein; a piston operating member; an extension on said casing, recessed to provide a control valve cylinder and a communicating weight compartment; a plurality of valve chambers in the casing certain of which are interconnected and connected with the control valve cylinder by a passage, others being interconnected and connected with the control valve cylinder by another passage; a duct leading from the one compression chamber into said control valve cylinder; another duct leading from the other compression chamber into each one of the plurality of valve chambers; a spring loaded valve in each of said valve chambers, certain of said valves operating at predetermined low fluid pressures in one or the other compression chambers to establish fluid flows therebetween, other of said valves operating at comparatively higher pressures within the compression chambers to establish an increase in the fluid flows therebetween; a valve in the control valve cylinder normally maintaining communication between the duct and both passages leading into said cylinder; and an inertia weight element adapted in response to accelerations of the casing in one direction only, to move said control valve to shut off communication between the duct and the passage leading from the valve chambers having the low pressure operating valves into said valve cylinder.

12. A shock absorber comprising, in combination, a casing providing a fluid containing cylinder; a piston in said cylinder forming two compression chambers therein; a piston operating member; an extension on said casing, recessed to provide a control valve cylinder and a communicating weight compartment; a plurality of valve chambers in the casing, certain of which are interconnected and connected with the control valve cylinder by a passage, others being interconnected and connected with the control valve cylinder by another passage; a duct leading from the one compression chamber into said control valve cylinder; another duct leading from the other compression chamber into each one of the plurality of valve chambers; a spring loaded valve in each of said valve chambers, certain of said valves operating at predetermined low fluid pressures in one or the other compression chambers to establish fluid flows therebetween, other of said valves operating at comparatively higher pressures within the compression chambers to establish an increase in the fluid flows therebetween; a valve in the control valve cylinder normally maintaining communication between the duct and both passages leading into said cylinder; an inertia weight element in the weight compartment, engaging the control valve, and adapted, in response to accelerations of the shock absorber casing toward said weight compartment at a predetermined acceleration, to move the control valve to shut off the low pressure valve passage from the control valve cylinder; and a dash pot in said valve cylinder for retarding the return movement of the control valve into normal position.

13. A double acting, hydraulic shock absorber for controlling the relative movements of the frame and axle of a vehicle comprising, in combination, a casing secured to the frame of the vehicle and providing a cylinder containing fluid; a piston in said cylinder, operatively connected to the vehicle axle, and forming two compression chambers in the casing cylinder; normally closed dual means adapted, in response to fluid pressure, to open and establish divided flows of fluid between the compression chambers; and means governed solely by oscillations of the casing of the shock absorber, for discontinuing one of said divided flows of fluid.

14. A double acting, hydraulic shock absorber for controlling the relative movements of the frame and axle of a vehicle comprising, in combination, a casing secured to the frame of the vehicle and providing a cylinder containing fluid; a piston in said cylinder, operatively connected to the vehicle axle, and forming two compression chambers in the casing cylinder; duel means adaped, in response to fluid pressures resulting from reciprocation of the piston, to open and establish divided flows of fluid between the respective compression chambers; and inertia weight controlled means, governed solely by accelerations of the vehicle frame toward the vehicle axle, for shutting off one of said divided flows of fluid.

15. A double acting, hydraulic shock absorber for controlling the relative movements of the frame and axle of a vehicle comprising, in combination, a casing secured to the frame of the vehicle and providing a cylinder containing fluid; a piston in said cylinder, operatively connected to the vehicle axle, and forming two compression chambers in the casing cylinder; low and high pressure release valves adapted, in response to reciprocation of the piston by oscillations of either the vehicle axle or frame, to establish divided flows of fluid between said compression chambers; means governed solely by oscillations of the vehicle frame for shutting off the flow of fluid established by the low pressure release valves.

16. A double acting, hydraulic shock absorber for controlling the relative movements of the frame and axle of a vehicle comprising, in combination, a casing secured to the frame of the vehicle and providing a cylinder containing fluid; a piston in said cylinder, operatively connected to the vehicle axle, and forming two compression chambers in the casing cylinder; low and high pressure release valves adapted, in response to reciprocation of the piston by oscillations of either of the vehicle axle or frame, to establish divided flows of fluid between said compression chambers; and an inertia weight controlled valve adapted to shut off the flow of fluid established by the low pressure release valve only in response to accelerations of the vehicle frame toward the vehicle axle.

17. A double acting hydraulic shock absorber for controlling the relative movements of the frame and axle of a vehicle comprising, in combination, a casing secured to the frame of the vehicle and providing a cylinder containing fluid; a piston in said cylinder, operatively connected to the vehicle axle, and forming two compression chambers in the casing cylinder; low and high pressure release valves adapted, in response to reciprocation of the piston by oscillations of either the vehicle axle or frame, to establish divided flows of fluid between said compression chambers; a control valve; an inertia weight element normally holding said control valve to maintain the established divided flows of fluid between the compression chambers and adapted, in response to predetermined accelerations of the vehicle frame toward the vehicle axle, to shut off the flows of fluid established by the low pressure release valves; and means adapted to retard the return movement of the control valve into its normal position.

18. An hydraulic shock absorber comprising, in combination, a casing having a cylinder in which a reciprocative piston forms two compression chambers; ducts connecting said chambers; pressure operated means in said ducts, certain of which are adapted to establish a fluid flow at a definitely low pressure and others at a definitely higher pressure; and an inertia controlled valve for rendering certain of said valves ineffective in response to accelerative movements of the shock absorber.

19. An hydraulic shock absorber comprising, in combination, a casing having a cylinder in which a reciprocative piston forms two compression chambers; ducts connecting said chambers; high and low pressure release valves in said ducts; and a control valve provided with an inertia mass for rendering the low pressure release valves ineffective in response to accelerative movements of the shock absorber.

20. An hydraulic shock absorber comprising, in combination, a casing having a cylinder in which a reciprocative piston forms two compression chambers; ducts connecting said chambers; high and low pressure release valves in said ducts; an inertia controlled valve adapted to render the low pressure release valves ineffective, in response to accelerative movements of the casing; and means for retarding the return of the inertia controlled valve into low pressure valve operation restoring position.

21. A shock absorber for resisting the relative movements of the frame and axles of a vehicle comprising, in combination, separate means for determining the degree of resistance offered by the shock absorber to slight and extensive movements respectively of the frame and axles of the vehicle; and means responsive to accelerations in the movement of the vehicle frame for retaining only the higher degree of shock absorber resistance for all movements of the frame and axle of the vehicle.

MAURICE OLLEY.